UNITED STATES PATENT OFFICE 1,944,645

MANUFACTURE OF AZO-DYESTUFFS

Ernst Hug, Neu-Allschwil, near Basel, and Max Müller, Basel, Switzerland, assignors to Durand & Huguenin S. A., Basel, Switzerland No Drawing. Application January 4, 1933, Serial No. 650,205, and in Germany January 14, 1932

5 Claims. (Cl. 260—96)

It has been found that valuable dyestuffs are obtained by subjecting to a nitrating operation a mono-azo-dyestuff having the following general formula:

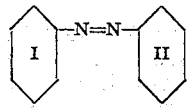

wherein I and II represent benzene nuclei of which one contains as a substituent a sulphogroup and the same or the other nucleus contains as a substituent a dialkylated amino-group, and may be further substituted by an alkyl-, an alkoxy-group or halogen.

The dyestuffs thus obtained have a good affinity for the cellulose ester fibre. They dye this fibre bright shades having good properties of fastness and are also of interest for printing purposes.

The new dyestuffs are different from those which are obtained from a nitraniline sulphonic acid and an aniline derivative which is alkylated in the amino group, or from a nitraniline and a corresponding sulphonated aniline derivative, such as described in the French Patent No. 584,215. Also, the present process for producing the new dyestuffs is different from the process described in the said French patent.

In the German Patent No. 445,827 there is described the coupling of the diazo compound of p-chloraniline sulphonic acid with diphenylamine and the nitration of the dyestuff so obtained. In the Colour Index No. 145 and 146 and in the Bulletin de la Société Chimique de Paris 1905, pages 973–993, are described products which are made by nitrating the azo-dyestuff from diazotized sulphanilic acid and diphenylamine or the nitroso compound of this azo-dyestuff. All these last mentioned dyestuffs are derived from diphenylamine. They are not recommended for dyeing acetate silk and are indeed not suitable for this purpose.

The dyestuffs obtained according to this invention on the other hand are derived specifically from a dialkylaniline. They are remarkably suitable for dyeing acetate silk.

The improved process is illustrated by the following examples:

Example 1

33.3 grams of the azo-dyestuff from diazotized metanilic acid and diethylaniline (equals $\frac{1}{10}$ mol.) are dissolved, whilst stirring, in 330 grams of concentrated sulphuric acid at about 10° C. While cooling down, there are then slowly run in drop by drop 70 grams of mixed acid of 11 per cent strength (=7.7 grams HNO₃). The temperature may be allowed to rise to 17° C. When all the mixed acid has been added, the whole is stirred for some time at the aforesaid temperature and is then poured onto ice, whilst well stirring. The dyestuff is separated by filtration, pressed and then stirred with hot water, sodium carbonate being added until no further development of carbon dioxide takes place (slight excess); thereupon the whole is cooled down and the dyestuff is salted out, filtered by suction, pressed and dried.

The dyestuff thus obtained gives, when dyed on acetate silk, a reddish orange of good fastness.

Example 2

34.7 grams of the azo-dyestuff from diazotized metanilic acid and diethyl-m-toluidine (equals $\frac{1}{10}$ mol.) are dissolved at about 10° C. in ten times the quantity of concentrated sulphuric acid. While cooling down, 70 grams of mixed acid of 11 per cent strength are added slowly drop by drop, care being taken that the temperature does not exceed 17–18° C. When all the mixed acid has been added, the reaction mixture is stirred for some time at the aforesaid temperature and then poured onto a large quantity of ice. The dyestuff which precipitates is then filtered by suction, worked up and dried, as described in Example 1.

The dyestuff thus obtained yields when printed on a cellulose ester fabric a fast yellowish-red.

Example 3

38.1 grams of the azo-dyestuff from diazotized metanilic acid and diethyl-m-chloraniline (equals $\frac{1}{10}$ mol.) are subjected to nitration and worked up in the manner described in Example 1 or 2.

A dyestuff is obtained which dyes acetate silk fast reddish-orange shades.

Example 4

37.7 grams of the azo-dyestuff from diazotized metanilic acid and diethyl-m-phenetidine (equals $\frac{1}{10}$ mol.) are dissolved in sulphuric acid as described above. To this solution there are added drop by drop, while cooling down, 70 grams of mixed acid of 11 per cent strength. The further treatment is carried out as described in the above examples.

The dyestuff thus obtained yields on acetate silk an orange shade.

Example 5

34.7 grams of the azo-dyestuff from diazotized metanilic acid and methylbutylaniline are nitrated with mixed acid of 11 per cent strength and worked up in a manner analogous to that given in the preceding examples.

The dyestuff thus obtained yields, when dyed on cellulose ester fibre, bright fast orange shades.

Example 6

33.3 grams of the azo-dyestuff from diazotized o-sulphanilic acid and diethylaniline (equals $\frac{1}{10}$ mol.) are dissolved in ten times the quantity of concentrated sulphuric acid. For nitration, 70 grams of mixed acid of 11 per cent strength are added drop by drop, while cooling down and stirring well, care being taken that the temperature does not rise above 17° C. After having continued stirring for some time, the reaction product is poured on a large quantity of ice and the dyestuff is worked up in the manner above described.

When dyed on cellulose ester fibre the dyestuff thus obtained gives ruby-red shades.

Example 7

31.9 grams of the azo-dyestuff from diazotized o-sulphanilic acid and dimethyl-m-toluidine are nitrated and the product is worked up as described in Example 6.

The dyestuff thus obtained, when printed on cellulose ester fibre, yields fast red shades.

Example 8

37.4 grams (equals $\frac{1}{10}$ mol.) of the azo-dyestuff from diazotized 2.5-dichloraniline and dimethylaniline-m-sulphonic acid are dissolved at about 10° C. in ten times the quantity of concentrated sulphuric acid. Whilst well stirring, 70 grams of mixed acid of 11 per cent strength are then added slowly drop by drop, care being taken that the temperature does not exceed 17° C.

Stirring is continued for some time at about 15° C. Then the reaction mass is poured onto ice and the dyestuff which separates is filtered by suction. It is taken up in hot water and sodium carbonate is added until development of carbon dioxide ceases. After cooling down, the dyestuff is salted out, filtered by suction, pressed and dried.

The dyestuff thus obtained dyes cellulose ester fabrics bluish-red shades.

What we claim is:

1. A process for the manufacture of azo-dyestuffs, which consists in subjecting to a nitrating operation a mono-azo-compound of the following general type

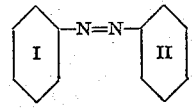

wherein I and II represent benzene nuclei of which one contains as a substituent a sulpho-group and the same or the other nucleus contains as substituent a dialkylated amino-group and may be further substituted by an alkyl, alkoxy or halogen.

2. A process for the manufacture of azo-dyestuffs, which consists in subjecting a mono-azo-compound obtained from a diazotized sulphanilic acid compound and a dialkylated amino-compound of the benzene series, to a nitrating operation.

3. A process for the manufacture of azo-dyestuffs, which consists in subjecting a mono-azo-compound obtained from diazotized metanilic acid and a dialkylated amino-compound of the benzene series, to a nitrating operation.

4. A process for the manufacture of azo-dyestuffs, which consists in subjecting a monoazo-compound obtained from diazotized metanilic acid and diethyl-meta-toluidine to a nitrating operation.

5. The azo-dyestuffs resulting from nitration of a mono-azo compound of the following general type

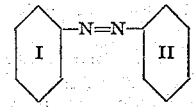

wherein I and II represent benzene nuclei of which one contains as a substituent a sulpho-group and the same or the other nucleus contains as a substituent a dialkylated amino-group and may be further substituted by an alkyl, alkoxy or halogen.

ERNST HUG.
MAX MÜLLER.